Figure 1:
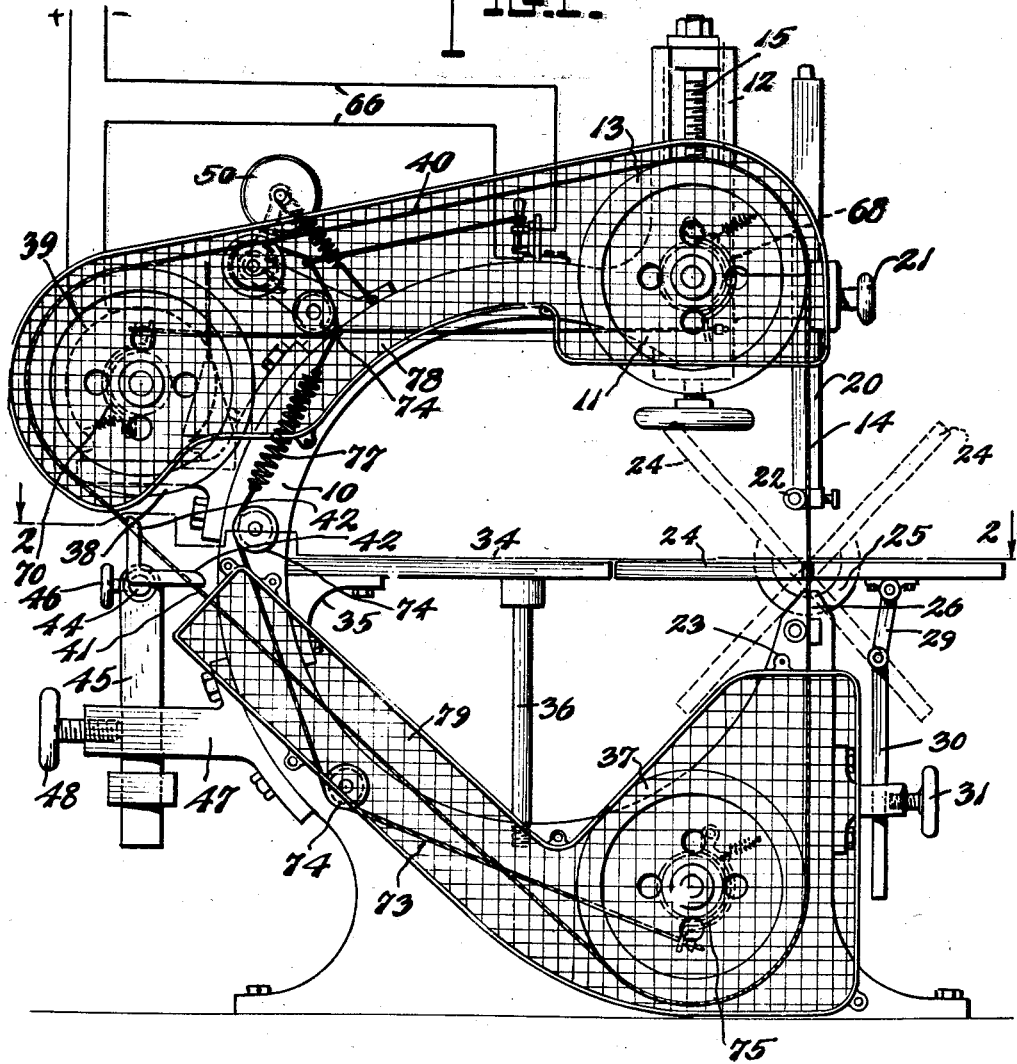

May 6, 1930.  C. E. SULLENBERGER  1,757,785
BAND SAWING MACHINE
Filed June 2, 1928   3 Sheets-Sheet 1

Inventor
C.E. Sullenberger
By Robb & Robb
Attorneys

May 6, 1930.   C. E. SULLENBERGER   1,757,785
BAND SAWING MACHINE
Filed June 2, 1928    3 Sheets-Sheet 2

Fig.2.

Fig.3.

Inventor
C.E.Sullenberger
By Robt G Robb
Attorneys

May 6, 1930.  C. E. SULLENBERGER  1,757,785
BAND SAWING MACHINE
Filed June 2, 1928  3 Sheets-Sheet 3
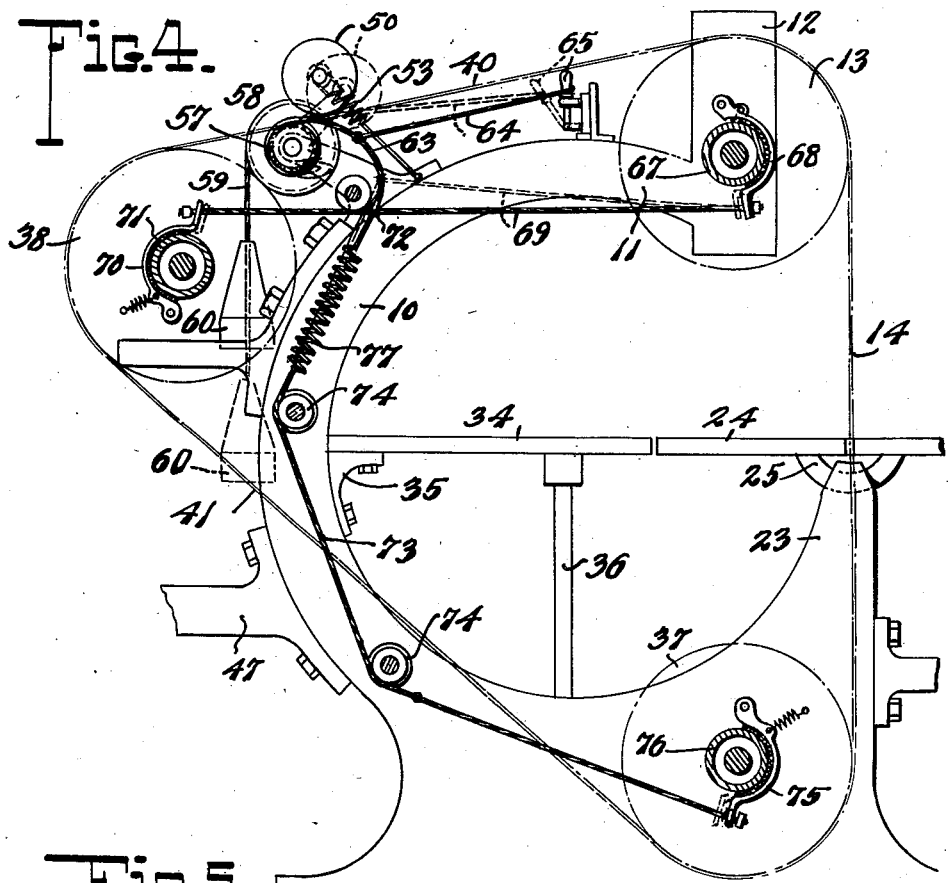

Patented May 6, 1930

1,757,785

UNITED STATES PATENT OFFICE

CHARLES E. SULLENBERGER, OF DALLAS, TEXAS

BAND SAWING MACHINE

Application filed June 2, 1928. Serial No. 282,329.

This invention relates to a band sawing machine and particularly to a construction whereby the work table may be adjusted for a wide range of angular cuts in its relation to the saw.

In the usual construction of band saws having opposite carrier wheels the return reach of the saw prevents a wide range of adjustment in vertical planes of the work table, such as an adjustment at an angle of 45 degrees to the vertical in order to produce cuts upon the material at an angle to the plane of travel of the saw. In such constructions no provision is made for utilizing a return reach of the saw for smaller work such as would be contained in a miter box. In previous band saw constructions no means has been provided by which the travel of the saw and its carrier wheels may be immediately stopped in event of breakage of the saw as it is essential for safety to stop operation of the driving motor and also of the saw in such event.

For the purpose of overcoming these objections and presenting a more efficient construction of band sawing machine I have provided a frame structure supporting three or more carrier wheels of equal diameter and of relatively less size than that ordinarily used in a two-wheel machine, and such an arrangement materially reduces the strain and angle of travel of the saw about such wheels so as to insure a longer operative life of the saw while maintaining its main cutting blade in a vertical plane. Cooperating with such a blade I provide a work table mounted for a wide range of adjustment extending substantially to 45 degrees at either side of the plane of the saw which permits the production of work having cuts at opposite angles which is particularly efficient in certain classes of work which cannot be performed upon the ordinary band saw arrangement where hand cutting is necessary to complete such angle cuts.

Provision has also been made for the use of a return reach of the saw for cutting purposes by the disposition of a work support at the rear of the saw frame which may be adjusted relative to the saw. It has also been found important to provide for cutting off the power and stopping the rotation of the saw carrying wheels in the event of breaking of the saw to prevent any whipping action of the latter and consequent injury to the operator, such brake mechanism being arranged for automatic application in event of a breakage of the saw blade.

The invention has for an object to present a novel and improved construction of band saw having more than two points of support in cooperation with a work table disposed at a vertical reach of the saw and adjustable in opposite directions at an acute angle to the plane of travel of the saw whereby opposite inclinations of cut may be effected.

A further object of the invention is to combine with a three-point saw support a work holding box disposed to cooperate with a return reach of the saw and adjustable relative to such portion of the saw.

Another object of the invention is to provide an automatic brake mechanism cooperating with the band saw and adapted upon the breakage of such saw to release the power driving means and also to stop rotation of the several carrier wheels for the saw.

Other and further objects and advantages will be hereinafter set forth and the novel features thereof defined by the appended claims.

Figure 7:
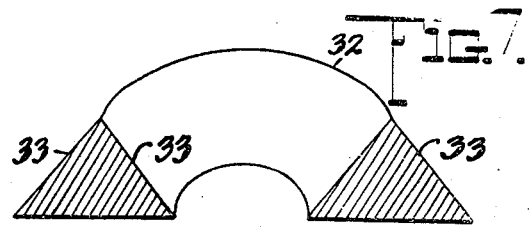

In the drawings:
Fig. 1 is an elevation of the invention;
Fig. 2 is a section on line 2—2 of Fig. 1;
Fig. 3 is a rear elevation;
Fig. 4 is a section on line 4—4 of Fig. 3;
Fig. 5 is a detail elevation of the brake control;
Fig. 6 is a detail section of the adjustable saw carrier; and
Fig. 7 is a sectional perspective showing one character of work adapted to be performed by the invention.

Like numerals refer to like parts in the several figures of the drawings.

The main frame 10 for the saw is of substantially C-shape formation which provides a large interior space for the manipulation of the work. The upper portion 11 of this frame is formed with the vertical extension 12 within which the carrier wheel 13 for the saw 14 is adjustably mounted in any preferred manner, for instance, by means of the screw 15 swiveled in the extension 12, and carrying a block 16 threaded thereon. The wheel 13 is mounted upon this block for lateral adjustment by means of the ball and socket joint 17 and the adjusting bolts 18 extending through the plates 19 at each side of the joint 17. The adjustment may be secured by loosening one of these bolts and tightening the other so as to dispose the wheel 13 in the exact plane for properly positioning the saw 14 in its path of vertical travel.

The upper portion 11 of the frame also carries a guide arm 20 mounted for vertical adjustment at 21 and having a saw engaging face 22 properly disposed in relation to the work to insure the true travel of the saw when cutting.

The forward extension 23 at the lower portion of the frame is provided with an adjustable work table 24 formed with an arcuate mounting 25 disposed within a bifurcated portion 26 of the extension 23. This table is formed with a slot 27 through which the saw operates and the inner portion of this slot is enlarged, as at 28, to permit the tilting adjustment of the table.

This adjustment may be effected and maintained by various means, for instance, a link 29 pivoted to the table and also to the adjusting post 30 which is held at any desired position by means of the clamping screw 31. By such an arrangement it will be seen that a table may be tilted in either direction at an acute angle to the vertical path of travel of the saw, for instance, at an angle of 45 degrees thereto, as shown by dotted lines in Fig. 1. Such an arrangement permits material to be cut at opposite angles, a sample of which is shown in Fig. 7 where a ring 32 may be cut with its walls 33 extending at opposite angles to each other. The work being supported upon the adjustable table can be inclined to the desired angle relative to the saw and the table secured so that the angle of cut will be effected as the work is manually fed to the saw.

The open frame 10 of the saw is also provided with a fixed table 34 supported at its inner end by a bracket 35 and at its outer portion by a post 36 from the base of the frame and this fixed table cooperates with the adjustable table when the latter is in horizontal position and permits the manipulation of material to be cut of considerable size.

The portion 23 of the frame has pivoted adjacent its base a carrier wheel 37 while a similar wheel 38 is journaled at the rear of the frame substantially opposite the front opening thereof. The shaft of the wheel 38 is provided with any suitable form of motor, such as an electric motor, indicated at 39, and constitutes the driven member of the saw support. The top reach 40 of the saw extends in a downward plane from the front wheel 13 to the wheel 38 and the lower reach 41 of the saw travels downwardly from the wheel 38 to the wheel 37 which is aligned with the upper wheel 13. These wheels or carriers are of any preferred construction and of substantially the same diameter, such diameter being less than that of the wheels ordinarily used in a two-wheel saw support. This arrangement of the wheels prevents excessive strain on the saw, permitting its operation with a minimum of resistance and so disposes the wheel beneath the work table that it is substantially within the outline of the frame so that ample space is provided for the tilting of the work table in either direction without contact with either the wheel or the supporting frame therefor.

Cooperating with the lower reach 41 of the saw I provide a miter box or work holder 42 having its angularly disposed walls slotted, as at 43, for the passage of the saw blade. This box is pivotally mounted at 44 upon a post or standard 45 and may be held in the desired adjustment by a clamp screw 46, as shown in Fig. 1. The post 45 is also vertically adjustable in the bracket 47 and held by the screw 48 so that the depth of cut of the saw within the box may be determined.

It is very desirable to provide this type of saw with means for cutting off the power and stopping the rotation of the wheels in the event of breakage of the saw, and an automatic means for that purpose has been provided, as shown in Figures 4 and 5. This automatic control comprises an idler roll 50 which travels upon the upper reach 40 of the saw blade and is normally supported thereby in the full line position in Fig. 4. The roll 50 is carried by an arm 51 pivoted upon a bearing 52 and is normally tensioned toward the blade by a spring 53 extending from the roll pivot to the frame. In the event of breakage of the saw this spring causes the roll to be shifted to the dotted line position shown in Fig. 4 which brings the trip nose 54 into contact with the arm 55 carried by a pawl 56 cooperating with a ratchet 57 upon a tension drum 58. In the form shown this drum is provided with a cable 59 wound thereon and an actuating weight 60 while the pawl is held in engagement by a spring 61 carried upon a supporting bracket 62 at the upper portion of the frame 10.

Upon release of this drum a cable connection 63 therefrom is placed under tension and an extension 64 from said connection primarily actuates a knife switch 65 controlling the circuit connection 66 to the driving motor 39 for the saw. When this switch is opened, as indicated by dotted lines in Fig. 4, the power is cut off from the motor, but it is also desirable to prevent continued rotation of the wheels and for that purpose they are provided with any desired form of brake, for instance, the upper wheel 13 has its hub 67 in cooperative relation with a brake shoe 68 from which the cable 69 extends to a similar shoe 70 operating upon the hub 71 of the driven wheel 38. This cable 69 is connected to the cable 63 at 72 and the cable 63 is continued downwardly at 73 over suitable idlers 74 and connects with a shoe 75 operating upon a drum 76 of the lower carrier wheel 37. This transmitting cable 73 may be connected with the cable 63 by means of an interposed coil spring 77 which provides for a yielding adjustment of the brake members. From the construction described it will be seen that when the idler held under tension by the saw band is released through the breaking of the saw, the power will be automatically disconnected and the brakes applied to the several carrier wheels for the saw band. The various moving parts of the saw and its support may be protected by a suitable enclosing screen, this being formed in an upper section 78 detachably mounted upon the frame and a lower section 79 similarly mounted so that the only exposed portions of the saw are those cooperating with the work table at the front and the work box at the back of the frame.

The operation of the invention will be apparent from the foregoing description from which it will be seen that the mounting of the work table relative to the saw at the open front of the frame permits the adjustment of the table at acute angles to the saw and thus provides for a variety of cuts and at an angle to each other which cannot be secured by the ordinary table mounting which is not capable of the degree of adjustment necessary for such work. The structure also presents a supplemental work support cooperating with a return reach of the saw so that work of a smaller character such as would be handled in a miter box may be effected simultaneously with the use of the vertical reach of the saw for other cutting operations. The invention also presents automatic control means for stopping all operation of the parts in event of a breakage of the saw.

While the details of construction have been herein shown and described, the invention is not confined hereto as changes and alterations may be made without departing from the spirit thereof as defined by the following claims.

I claim:

1. In a band sawing machine, an open frame having forwardly projecting portions, saw supporting means located upon said portions and also at the rear of the frame, a saw carried by said means having its reach between said projecting portions disposed in a vertical plane, a work table associated with said vertical reach of the saw and tiltable in either direction at an acute angle thereto, a work holder carried by the rear of the frame to cooperate with the saw at that point, and means for adjusting said work holder vertically and also in a rotative path relative to the saw.

2. In a band sawing machine, an open frame, triangularly disposed carrier wheels, a saw traversing said wheels, a work holder disposed at the rear of the frame recessed to receive the lower reach of the saw, a vertically adjustable standard upon the frame, and a rotatable connection at the upper end of said standard for the work holder.

3. In band sawing machine, a series of carrier wheels rotatable thereon, a saw traversing said wheels, brake drums upon said wheels, shoes cooperating with said drums, cable connections from said shoes, a tensioned winding drum receiving one end of said connections and having a holding ratchet, a retaining pawl engaging said ratchet, a roller tensioned to contact with said saw, and a trip finger carried by a lever supporting said roller and disposed to engage and release the holding pawl upon breakage of the saw blade, whereby to actuate said brake shoes.

In testimony whereof I affix my signature.

CHARLES E. SULLENBERGER.